Figure 1:
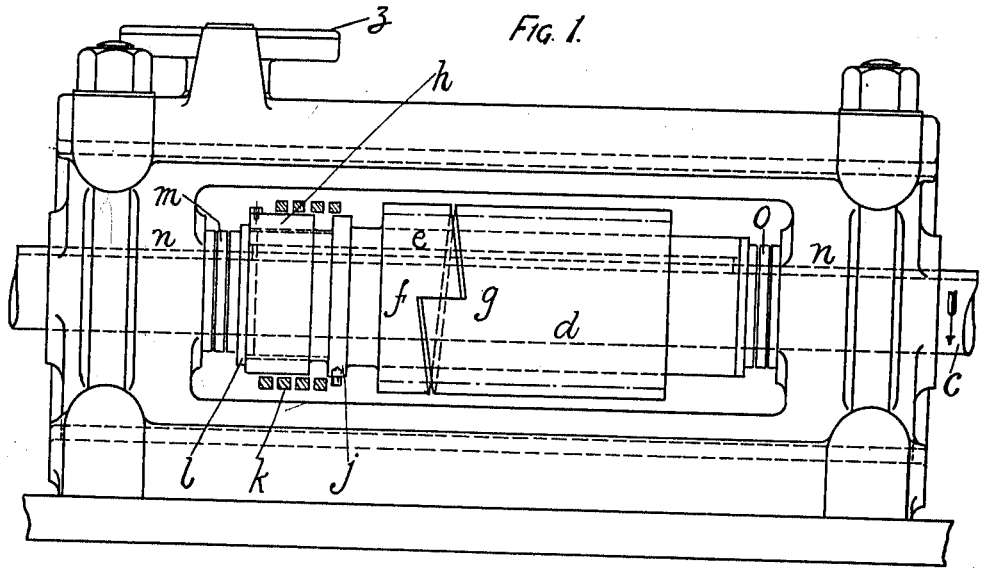

J. H. MELLOY AND W. OWEN.
MACHINE TOOL EMPLOYING WORM GEARING FOR DIVIDING PURPOSES.
APPLICATION FILED JAN. 19, 1918.

1,316,966.

Patented Sept. 23, 1919.
4 SHEETS—SHEET 1.

INVENTORS:
James Henry Melloy
Willis Owen
By Wm Wallace White
ATTY.

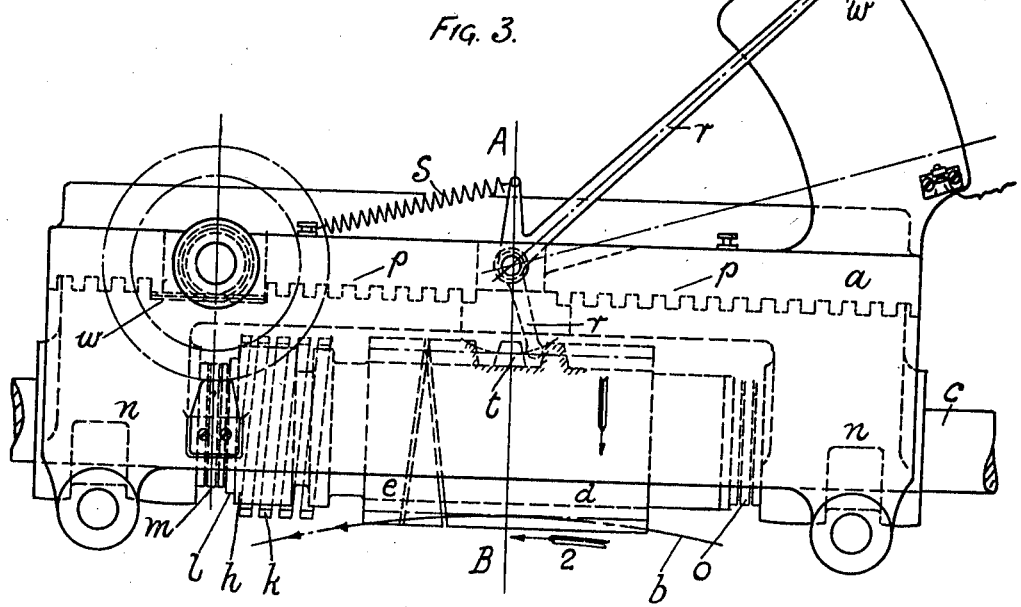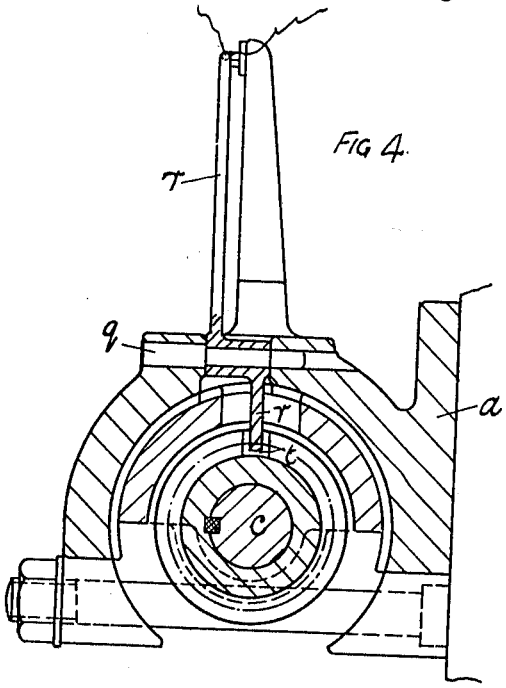

J. H. MELLOY AND W. OWEN.
MACHINE TOOL EMPLOYING WORM GEARING FOR DIVIDING PURPOSES.
APPLICATION FILED JAN. 19, 1918.

1,316,966.

Patented Sept. 23, 1919.
4 SHEETS—SHEET 3.

INVENTORS:
James Henry Melloy
Willie Owen
By Wm Wallace White
ATTY

J. H. MELLOY AND W. OWEN.
MACHINE TOOL EMPLOYING WORM GEARING FOR DIVIDING PURPOSES.
APPLICATION FILED JAN. 19, 1918.

1,316,966.

Patented Sept. 23, 1919.
4 SHEETS—SHEET 4.

INVENTORS:
James Henry Melloy
Willie Owen
By Wm Wallace White
ATTY.

UNITED STATES PATENT OFFICE.

JAMES HENRY MELLOY AND WILLIE OWEN, OF MANCHESTER, ENGLAND, ASSIGNORS OF ONE-THIRD TO WILLIAM MUIR AND COMPANY LIMITED, OF MANCHESTER, ENGLAND.

MACHINE-TOOL EMPLOYING WORM-GEARING FOR DIVIDING PURPOSES.

1,316,966.  Specification of Letters Patent.  Patented Sept. 23, 1919.

Application filed January 19, 1918. Serial No. 212,749.

*To all whom it may concern:*

Be it known that we, JAMES HENRY MELLOY and WILLIE OWEN, both subjects of the King of Great Britain, residing at Britannia Works, Sherbourne street, Manchester, in the county of Lancaster, England, have invented new and useful Improvements in Machine-Tools Employing Worm-Gearing for Dividing Purposes, of which the following is a specification.

This invention relates to improvements in gear cutting machines and other machine tools employing worm gearing for dividing purposes, and consists essentially in the provision of means for compensating during rotation for the wear of the worm in order to prevent such wear affecting the accuracy of the work under production.

The necessity for compensation arises from first, the wear of the worm tooth during cutting, resulting in a different relative position of the teeth of the worm wheel and worm affecting the angle of the tooth in the work produced, and, secondly, the accumulation of such wear resulting in backlash.

We further embody, as a feature of our invention, the provision of means for indicating the amount of wear.

In gear hobbing machines and machines of a like nature, the work is usually rotated by means of a worm and worm wheel and it is more particularly to this type of machine and to the worm mentioned that this invention is intended to apply.

Previously, in such machines, the worm has not been fitted with any means to prevent the effects of the wear being produced in the work nor have means been provided to indicate the amount of such wear during rotation nor has it been possible even to remove backlash during rotation, the only known refinement in this direction being the arrangement of the worm in such a manner that the backlash can be taken out, but only when the machine is at rest and such periodic removal of the backlash merely removes shake and is not intended to, and does not, prevent the effect of the wear being produced on the work.

An embodiment of the invention is illustrated in the accompanying four sheets of drawings in which—

Figure 2:
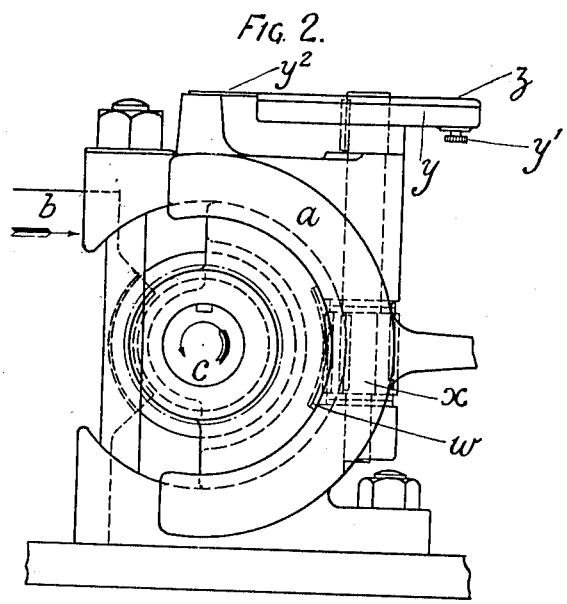
Figure 5:
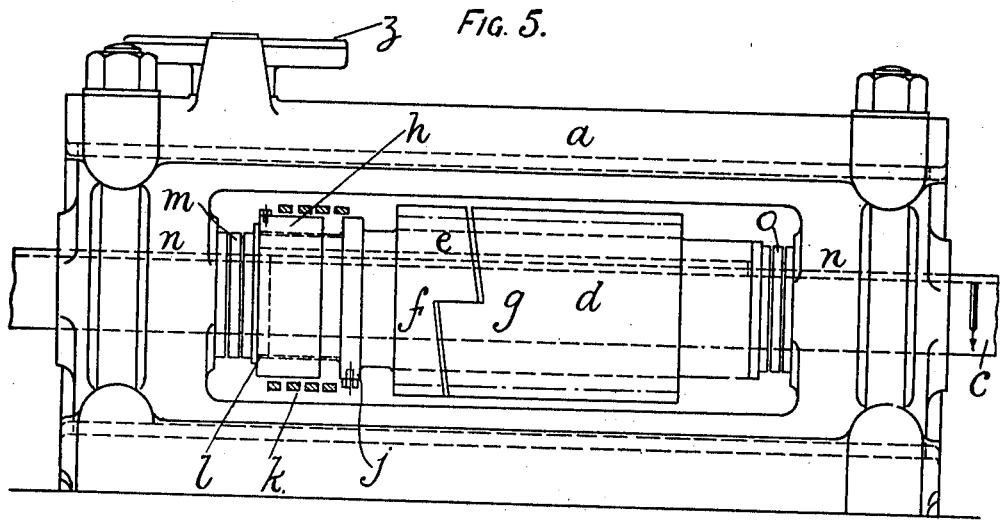
Figure 6:
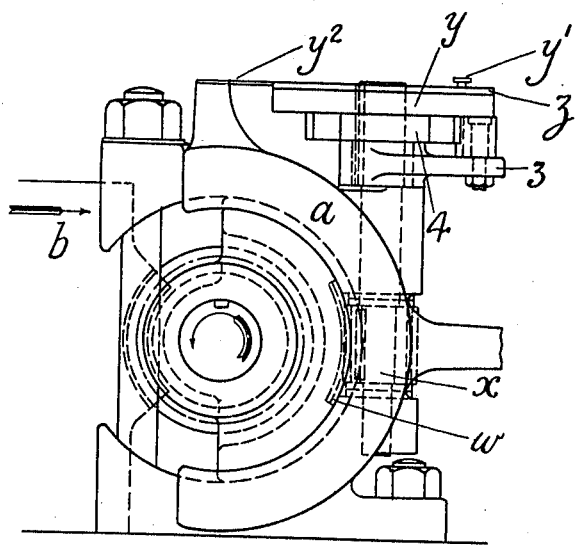

Figure 1 is a side elevation. Fig. 2 an end view. Fig. 3 a plan and Fig. 4 a transverse section on the line A B, Fig. 3.

Figs. 5, 6, 7 and 8 are similar views to Figs. 1 to 4 respectively but with the mechanism arranged to compensate for the wear automatically.

The constructions shown are merely intended as illustrations and not as limitations and we reserve the right of departing from these constructions while retaining the essential features of the invention.

The wear-compensating mechanism shown is supposed to be applied to the dividing worm of a gear hobbing machine similar to that described and claimed in the specification to the British patent of Wm. Muir and Company, Limited, and Melloy's No. 6595 of 1911.

The enveloping bracket $a$ is carried upon the bed of such machine, and the table $b$, to which is attached the worm wheel, carries the work which is being produced. The shaft $c$ which is driven in the usual manner, has keyed upon it the worm $d$ which rotates the worm wheel and table $b$. To the end of this worm $d$ is fitted a shorter section of similar worm $e$ keyed to the same shaft $c$ and fitted in such a way that the thread of the worm is not cut through in a manner to leave a feather edge but the section is cut round in a spiral to follow the thread, the joints of the thread being across the line $f$—$g$, Fig. 1. The end of this section worm $e$ is screwed, and a nut $h$ fitted upon it. Attached to the worm section $e$ at $j$ is a strong coiled spring $k$ the other end of which is attached to the nut $h$. This spring is placed upon the worm section $e$ and the nut $h$ in such a manner as to exert a turning movement upon the nut $h$ in a direction tending to wind the nut $h$ off the worm $e$ and sufficient tension is put into the spring $k$ to overcome the friction of the threads of the nut $h$ on the worm $e$. The nut $h$ abuts upon a plate $l$ which thrusts on to ball washers $m$ bearing against the boss of the bracket $n$. The other end of the worm $d$ also thrusts upon ball washers $o$. The whole of this mechanism is carried in the circular bracket or casing $n$ which is screwed on its periphery and fits into the bracket $a$, which is also screwed as shown at $p$, Fig. 3. Fitted to the bracket $a$ carried by a pin $q$, Fig. 4, protruding through an opening in the circular bracket $n$ is a lever $r$ the end of which presses lightly against the side of the thread of the worm $d$ by a spring $s$. One thread of the worm $d$ is cut through at $t$ as shown in section, Fig. 3, and shown also in Fig. 4. To the end of the extension arm of the lever $r$ is fitted a screw $u$ with an electrical point contact which can make contact with a corresponding screw $v$ carried on a projection from the bracket $a$. These two contacts are connected in the usual way with a battery and bell or other signal, not shown. At one portion in the circular bracket $n$, worm wheel teeth $w$, Fig. 3, are cut which gear with a worm $x$, Fig. 2, carried in the body of the bracket $a$ and actuated by a hand wheel $y$. Fitted to the hand wheel $y$ is a loose index plate $z$ which can be adjusted on the hand wheel $y$ but locked to it when required by means of a pinching screw $y'$. An indicator or pointer $y^2$ projecting on the index ring $z$ is carried on a projection from the bracket $a$.

The operation of the mechanism is as follows:—

The shaft $c$ is rotated in such a manner as to rotate the worm wheel and table $b$ in the direction shown by the arrow 1, Fig. 3, thus insuring that the pressure on the worm threads is coming upon that side which the lever $r$ is pressing upon and also that the main thrust of the worm is coming upon the ball washers $o$.

Clearance is cut between the two sections of worms $d$ and $e$ so as to allow the threads of the worm section $e$ to come in contact with the opposite sides of the teeth of the worm wheel $b$ which are being acted upon by the worm $d$. During the rotation of the worm $d$ any wear which takes place upon the sides of the thread of that worm allows the teeth of the worm wheel $b$ to move relatively away from the worm $e$ and in the ordinary condition of things backlash would develop.

The coiled spring $k$ now comes into action and rotates the nut $h$ upon the worm section, thus causing the said section to follow up the relative movement of the teeth of the worm wheel $b$ to the worm section $e$, and so slightly closing the clearance space between the two sections $d$ and $e$ of the worm thus keeping the threads of the worm $e$ always in contact with the opposite sides of the teeth of the worm wheel $b$; the two sides of the worm wheel $b$ are therefore always held—the driving side by the large worm section $d$ and the opposite side by the short worm section $e$ thus automatically preventing any backlash developing.

During the rotation of the worm $d$ the lever $r$ being pressed upon the working sides of the threads of this worm by the spring $s$, will move in the arc indicated in Fig. 3, and as the slot $t$ in the worm $d$ comes around the lever $r$ will be pulled through that slot by means of the spring $s$ allowing the lever $r$ to swing in one direction slowly through the arc indicated and to drop back quickly under the influence of the spring. It is obvious that as the threads of the worm $d$ wear, the position of this arc of movement of the lever $r$ will change and if when the rotation of the worm is first commenced, the points of the contacts $u$ and $v$ are set just to prevent the actual contact the slight wear of this worm $d$ during rotation will cause the two screws $u$ and $v$ to come into contact thus ringing a bell, not shown, or giving any other suitable signal. The attention of the attendant is by this means drawn to the mechanism and the hand wheel $y$ is rotated by the attendant the required amount and by means of the worm $x$ and the worm teeth $w$ cut in the circular bracket $n$ this bracket is rotated on the center of the worm $d$ and due to its being screwed in the bracket $a$ is moved endwise in the direction of the arrow 2, Fig. 3, so as to bring the side of the tooth of the worm $d$ again into the original position relatively to the teeth of the worm wheel $b$. In this manner the slightest wear of the worm $d$ is brought instantly to the notice of the attendant, and that wear immediately compensated for, thus preventing the effects of such wear being produced on the worm wheel $b$ and consequently upon the work carried on the table.

The index plate $z$ is set to zero opposite the pointer $y^2$ at the commencement of rotation; consequently during any time after the adjustment of the hand wheel $y$ for compensating wear, the reading on the index plate $z$ will be an indication of the total amount of wear since the commencement of rotation.

The foregoing illustrates an arrangement of mechanism to compensate for wear by hand only.

Figs. 5, 6, 7 and 8 illustrate a method of compensating for wear automatically.

Figure 7:
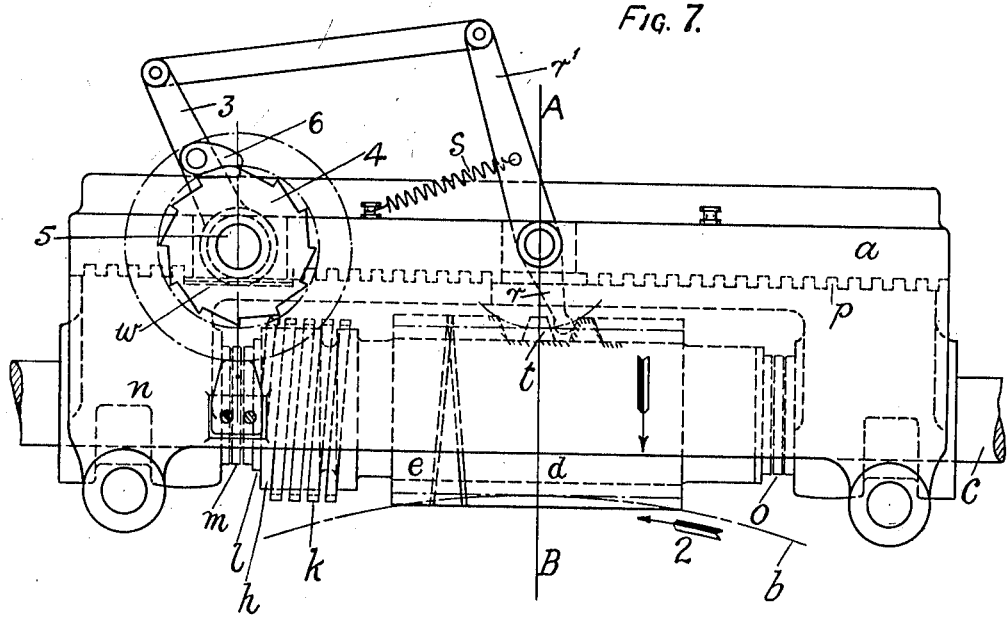
Figure 8:
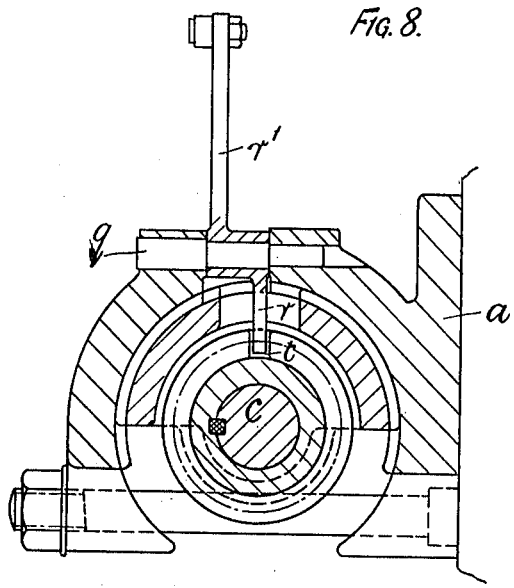

In this case the oscillating lever $r'$, Figs. 7 and 8, is connected to a ratchet lever 3 which can gear with a ratchet wheel 4 keyed upon the worm shaft 5. The ratchet lever 3 is loosely mounted upon the boss of the ratchet wheel. As the ratchet lever 3 oscillates under the influence of the oscillating lever $r'$, the ratchet catch 6 on the lever oscillates idly along the back of the teeth of the ratchet wheel 4 thus imparting no motion to the ratchet wheel but as the arc of oscillation of the ratchet lever 3 is moved slightly, due as before mentioned to the wear on the threads of the worm $d$, the ratchet catch 6 comes into gear with the teeth on the ratchet wheel which is then rotated one tooth; so imparting motion to the vertical shaft 5 and consequently as described to the worm $d$ thus again automatically bringing the threads of the worm *d* back into their original position relatively to the teeth of the wheel and so compensating for wear.

What we claim as our invention and desire to secure by Letters Patent of the United States is:—

1. In a machine tool employing worm gearing for dividing purposes, the combination with means actuated during rotation to compensate for the wear of the worm and means which during the rotation of the worm wheel automatically take up and compensate for backlash, of indicating means whereby it is rendered possible to observe at any moment during the rotation of the worm the amount of wear since the commencement of rotation.

2. In a machine tool, in combination, a combined table and worm wheel; a worm formed in two sections *d* and *e* with a clearance space between them; a nut *h* mounted on the worm section *e* and rotated by a coiled spring *k*; a lever biased to a predetermined position, a contact controlled by said lever, and electrical means controlled by said contact for indicating the wear of said worm.

3. In a machine tool, in combination, a combined table and worm wheel; a worm formed in two sections *d* and *e* with a clearance space between them; a nut *h* mounted on the worm section *e* and rotated by a coiled spring *k*; a worm shaft, a ratchet gear keyed to said shaft, and an oscillating lever *r'* operatively connected to said ratchet gear for actuating the latter, whereby the movements of said shaft are transmitted to the worm *d* to compensate for wear.

4. A machine of the character described, comprising a worm wheel and a worm meshing therewith, and means actuated during rotation of the worm to compensate for the wear of the worm.

5. A machine of the character described, comprising a worm wheel and a worm meshing therewith, means actuated during rotation of the worm to compensate for the wear of the worm, and means actuated during rotation of the worm for automatically compensating for backlash of the worm wheel.

6. A machine of the character described, comprising a shaft, a worm fixed to the shaft, a second worm keyed to said shaft, a worm wheel meshing with said worms, means for automatically actuating the second worm to prevent backlashing of the worm wheel, and means actuated by the first worm to compensate for the wear of the worm.

7. A machine of the character described, comprising a shaft, a worm fixed to the shaft, a second worm keyed to said shaft, a worm wheel meshing with said worms, means for automatically actuating the second worm to prevent backlashing of the worm wheel, means actuated by the first worm to compensate for the wear of the worm, and means actuated by the first worm for indicating the amount of wear thereof.

8. A machine of the character described, comprising a shaft, a worm fixed to the shaft, a second worm keyed to said shaft, a worm wheel meshing with said worms, means for automatically actuating the second worm to prevent backlashing of the worm wheel, means actuated by the first worm to compensate for the wear of the worm, and signaling means controllable by the first worm.

9. A machine of the character described, comprising a shaft, a worm fixed to the shaft, a second worm keyed to said shaft, a worm wheel meshing with said worms, means for automatically actuating the second worm to prevent backlashing of the worm wheel, means actuated by the first worm to compensate for the wear of the worm, a lever, means formed on the first worm for rocking said lever during rotation thereof, and a contact controlled by said lever.

10. A machine of the character described, comprising a worm wheel and a worm meshing therewith, means actuated during rotation of the worm to compensate for the wear of the worm, said means comprising a bracket rotatable upon said shaft, and means for moving said bracket longitudinally of said shaft, whereby said worm will be moved to compensate for the wear between said worm and said worm wheel.

In testimony whereof we have signed our names to this specification in the presence of two subscribing witnesses.

JAMES HENRY MELLOY
WILLIE OWEN.

Witnesses:
S. W. GILLETT,
HERBERT ROWLAND ABBEY.